US011611292B2

(12) United States Patent
Aoyagi et al.

(10) Patent No.: US 11,611,292 B2
(45) Date of Patent: Mar. 21, 2023

(54) POWER CONVERSION DEVICE

(71) Applicant: Hitachi Astemo, Ltd., Hitachinaka (JP)

(72) Inventors: Shigehisa Aoyagi, Tokyo (JP);
Toshiyuki Ajima, Tokyo (JP); Kotaro Shiino, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 68 days.

(21) Appl. No.: 17/421,918

(22) PCT Filed: Aug. 19, 2019

(86) PCT No.: PCT/JP2019/032224
§ 371 (c)(1),
(2) Date: Jul. 9, 2021

(87) PCT Pub. No.: WO2020/161945
PCT Pub. Date: Aug. 13, 2020

(65) Prior Publication Data
US 2022/0029572 A1 Jan. 27, 2022

(30) Foreign Application Priority Data
Feb. 5, 2019 (JP) .............................. JP2019-018586

(51) Int. Cl.
*H02P 1/00* (2006.01)
*H02P 3/00* (2006.01)
(Continued)

(52) U.S. Cl.
CPC ......... *H02M 7/5395* (2013.01); *H02M 7/493* (2013.01); *H02M 7/537* (2013.01); *H02P 25/22* (2013.01); *H02P 27/08* (2013.01)

(58) Field of Classification Search
CPC .......... H02P 25/22; H02P 27/08; H02M 7/537
(Continued)

(56) References Cited

U.S. PATENT DOCUMENTS

| 6,384,567 B1 | 5/2002 | Maeda |
| 9,906,183 B1* | 2/2018 | Agirman ................. H02P 27/08 |
| 2017/0237377 A1* | 8/2017 | Furukawa ............. H02P 29/028 |
| | | 318/564 |

FOREIGN PATENT DOCUMENTS

| JP | H03-007068 A | 1/1991 |
| JP | H10-155201 A | 6/1998 |

(Continued)

OTHER PUBLICATIONS

International Search Report with English translation and Written Opinion issued in corresponding application No. PCT/JP2019/032224 dated Nov. 5, 2019.

*Primary Examiner* — Erick D Glass
(74) *Attorney, Agent, or Firm* — Foley & Lardner LLP

(57) ABSTRACT

An object of the present invention is to provide a power conversion device including a plurality of inverter circuits connected in parallel to a load, the power conversion device being capable of performing control with a smaller number of microcomputers, having high reliability, and being advantageous for miniaturization and cost reduction. Provided are: a plurality of inverter circuits connected in parallel to a load; a microcomputer which controls the plurality of inverter circuits; a plurality of signal selection units which select a drive signal of each of the plurality of inverter circuits; and a first transmission path and a second transmission path which are connected in parallel between the microcomputer and the plurality of signal selection units and transmit the drive signal of each of the plurality of inverter circuits from the microcomputer to each of the plurality of signal selection units. Each of the plurality of signal selection units selects any one of a first drive signal transmitted from the first transmission path and a second drive signal transmitted from the second transmission path.

15 Claims, 13 Drawing Sheets

(51) Int. Cl.
 *H02P 1/28* (2006.01)
 *H02M 7/5395* (2006.01)
 *H02M 7/537* (2006.01)
 *H02P 25/22* (2006.01)
 *H02P 27/08* (2006.01)
 *H02M 7/493* (2007.01)

(58) Field of Classification Search
 USPC ......................................................... 318/504
 See application file for complete search history.

(56) References Cited

FOREIGN PATENT DOCUMENTS

| | | |
|---|---|---|
| JP | 2001-157487 A | 6/2001 |
| JP | 2006-223036 A | 8/2006 |
| JP | 2011-041420 A | 2/2011 |
| JP | 2017-005821 A | 1/2017 |

\* cited by examiner

POWER CONVERSION DEVICE

TECHNICAL FIELD

The present invention relates to a configuration of a power conversion device, and particularly to a technique effective for application to an in-vehicle power conversion device requiring high reliability.

BACKGROUND ART

A power conversion device such as an inverter controls a current of a polyphase rotary electric machine by pulse width modulation (PWM). In a case where the rotary electric machine is a three-phase motor, a voltage command value to be applied to each of three-phase windings is compared with a carrier signal serving as a reference of PWM to switch on and off of a switching element of a three-phase inverter, thereby controlling currents of the three-phase windings.

An output torque and a rotation speed of the three-phase motor are controlled to desired values by the three-phase winding currents. Then, for the control of the output torque, it is necessary to appropriately control a phase of an applied voltage, and it is necessary to accurately grasp a rotor position of the motor.

Further, there is a case where windings of motors having the same rotation axis are driven by a plurality of inverters for the purpose of improving efficiency and avoiding a decrease in torque when a failure occurs. It is necessary to apply an AC voltage having a phase difference due to the arrangement of the windings for each of the inverters in order to drive the respective inverters, and this AC voltage becomes an independent signal.

As a background art in this technical field, for example, there is a technique such as PTL 1. PTL 1 describes a problem in a method of driving motors having the same rotation axis by a plurality of inverters, and describes a method of selecting an inverter to be driven according to a load amount from among the plurality of inverters and sharing a total load amount by the selected inverter. With this method, the operation is continued with a small number of inverters when the load is low or with a normal inverter when an inverter becomes abnormal.

CITATION LIST

Patent Literature

PTL 1: JP 2001-157487 A

SUMMARY OF INVENTION

Technical Problem

In PTL 1 described above, driving is performed with the small number of inverters when the load is low, so that it is possible to reduce a motor iron loss and improve the efficiency by increasing an applied voltage per driving. Further, the number of inverters that are not driven increases, and thus, the efficiency can be also improved by reducing a switching loss of the inverters.

Further, since the operation is continued with the normal inverter when an inverter is abnormal, it is possible to suppress defects such as torque reduction and motor stop when the abnormality occurs. In PTL 1, it is assumed that efficiency can be improved and the defects can be suppressed by individually controlling the plurality of inverters.

The AC voltages applied to the motor windings by the inverters are calculated by calculation devices respectively provided in the inverters, the number of calculation devices substantially the same as the number of inverters is required. These calculation devices are configured using a microcomputer or the like, but need to have performance of executing calculation processing at high speed in order to calculate an AC signal. However, PTL 1 does not disclose a technique for calculating an AC voltage with a smaller number of calculation devices than the number of a plurality of inverters.

Therefore, an object of the present invention is to provide a power conversion device including a plurality of inverter circuits connected in parallel to a load, the power conversion device being capable of performing control with a smaller number of microcomputers, having high reliability, and being advantageous for miniaturization and cost reduction.

Solution to Problem

In order to solve the above problems, the present invention includes: a plurality of inverter circuits connected in parallel to a load; a microcomputer which controls the plurality of inverter circuits; a plurality of signal selection units which select a drive signal of each of the plurality of inverter circuits; and a first transmission path and a second transmission path which are connected in parallel between the microcomputer and the plurality of signal selection units and transmit the drive signal of each of the plurality of inverter circuits from the microcomputer to each of the plurality of signal selection units. Each of the plurality of signal selection units selects any one of a first drive signal transmitted from the first transmission path and a second drive signal transmitted from the second transmission path.

Advantageous Effects of Invention

According to the present invention, it is possible to realize the power conversion device including the plurality of inverter circuits connected in parallel to the load, the power conversion device having high reliability and being advantageous for miniaturization and cost reduction.

Other objects, configurations, and effects which have not been described above become apparent from embodiments to be described hereinafter.

DESCRIPTION OF EMBODIMENTS

Hereinafter, embodiments of the present invention will be described with reference to the drawings. Incidentally, the same configurations in the respective drawings will be denoted by the same reference signs, and detailed descriptions of the overlapping parts will be omitted.

First Embodiment

Figure 1:
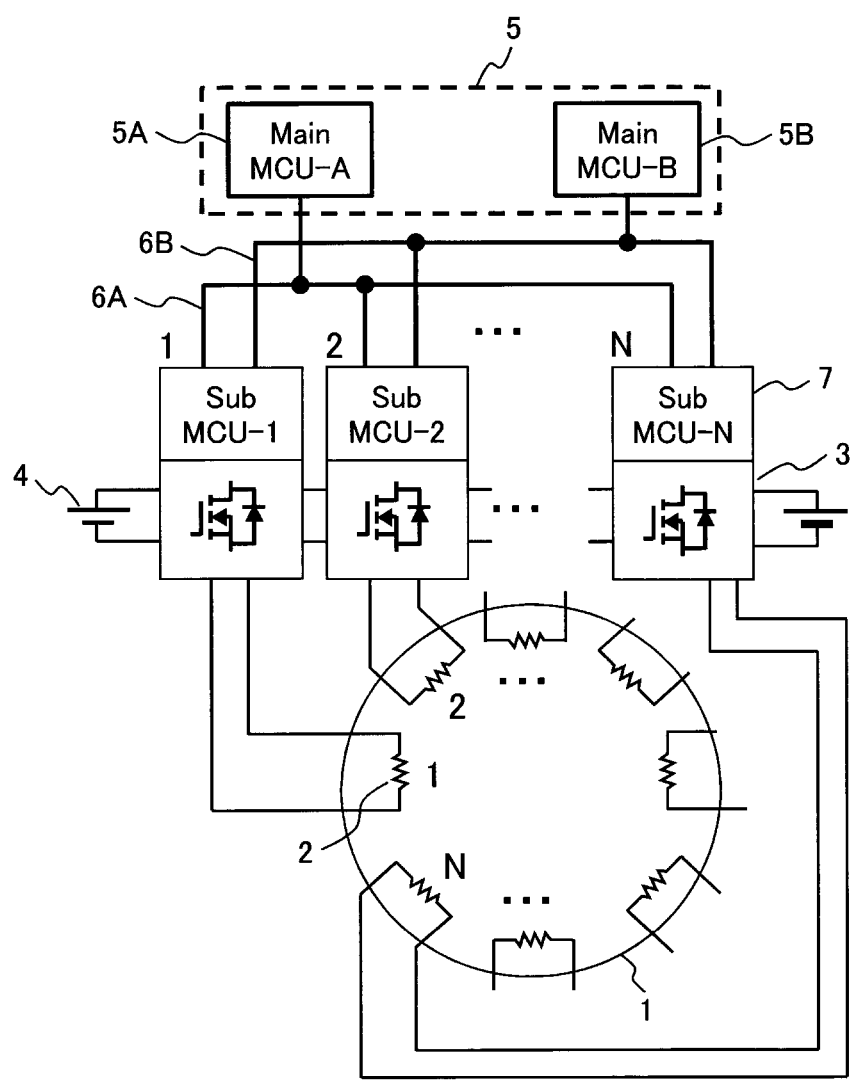
FIG. 1 is an overall configuration diagram of a power conversion device according to an embodiment of the present invention.

A power conversion device according to a first embodiment of the present invention will be described with reference to FIGS. 1 to 7. FIG. 1 is an overall configuration diagram of a power conversion device according to the present embodiment. A motor 1 of FIG. 1 includes N-phase (N) windings 2 each of which is single-phase winding, and has the same rotation axis. The inverter 3 is configured using N H-bridge circuits (inverter circuits) because the inverter 3 needs to have the same number of phases as the windings 2, the H-bridge circuit including four switching elements that drive windings of one phase.

The inverter 3 converts a DC voltage of a DC voltage power supply 4 into an AC voltage and applies the AC voltage to the winding 2 of the motor 1. The AC voltage output from the inverter 3 is calculated by a main MCU-A (5A) and a main MCU-B (5B) of a main calculation device (microcomputer) 5. The two calculation devices 5A and 5B of the main calculation device 5 are redundant. Even if one of the two calculation devices fails, the other can perform independent control.

The main calculation devices 5A and 5B transmit a drive signal of the inverter 3 to the N calculation devices of a sub-calculation device 7 via a transmission path 6A and a transmission path 6B, respectively. Since drive signals of independent inverters are transmitted to the transmission path 6A and the transmission path 6B, the sub-calculation device 7 selects a signal of the transmission path 6A or the transmission path 6B based on a predetermined condition and uses the selected signal as the drive signal of the inverter 3.

Figure 2:
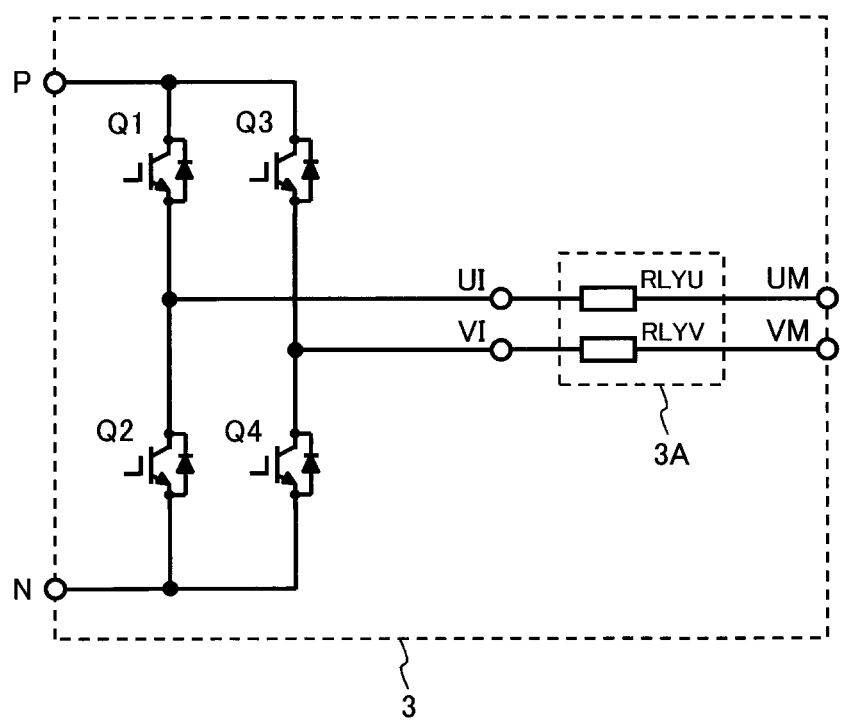
FIG. 2 is a diagram illustrating a circuit configuration example of an inverter 3 in FIG. 1.

FIG. 2 illustrates a circuit configuration example of the inverter 3. The inverter 3 is configured using the H-bridge circuit of four elements including an upper arm Q1 and a lower arm Q2 connected to a U-phase output UI and an upper arm Q3 and a lower arm Q4 connected to a V-phase output VI. The H-bridge circuit has P and N connected to the DC voltage power supply 4, and a DC voltage VBAT is applied as an input. An AC voltage is applied between the U-phase output and the V-phase output by switching each arm between an on-state and an off-state based on a drive signal applied to Q1 to Q4.

Further, the inverter 3 sometimes includes a phase relay 3A for the purpose of cutting off a connection with the winding 2 when a failure occurs. The phase relay 3A is connected between the U-phase output UI and UM and between the V-phase output VI and VM, and connects a portion between UM and VM to the winding 2. In a normal state of the inverter 3, a closed circuit is configured by closing the phase relay 3A. In an abnormal state, the winding 2 and the inverter 3 can be disconnected by opening the phase relay 3A.

As the winding 2 and the inverter 3 are disconnected, a current flowing from the winding 2 can be cut off, and generation of a brake torque of the motor 1 can be suppressed. For the phase relay 3A, an IGBT or a MOSFET may be used as a semiconductor relay as well as a mechanical relay.

Next, a processing content of the main calculation device 5 will be described. Each of the main calculation devices 5A and 5B independently calculate a voltage applied to the winding 2 of the motor 1. Although not illustrated, phase information θ, obtained by detecting a rotor position of the motor 1 by a phase detector or a phase estimator, is input to the main calculation devices 5A and 5B. An angular velocity ω1 is calculated by differentiating the phase θ based on Formula 1. Further, current command values Id and Iq are calculated based on a command value of a torque or a speed instructed from a host device, and voltage command values Vd and Vq are calculated from Formula 2. Here, R1, Ld, Lq, and Ke are constants representing characteristics of the motor, and represent a resistance value for one phase, a d-axis inductance, a q-axis inductance, and an induced voltage constant in this order. Further, p is a differential operator.

$$\omega_1 = \frac{d\theta}{dt} \qquad \text{[Formula 1]}$$

$$\begin{bmatrix} V_d \\ V_q \end{bmatrix} = \begin{bmatrix} R_1 + pL_d & \omega_1 L_q \\ \omega_1 L_d & R_1 + pL_q \end{bmatrix} \begin{bmatrix} 0 \\ K_e \omega_1 \end{bmatrix} \qquad \text{[Formula 2]}$$

The voltage command values Vd and Vq are dq-axis voltages of a rotating coordinate system. Since an applied voltage of the inverter 3 needs to be an AC signal, conversion from the rotating coordinate system to a fixed coordinate system is required. Formula 3 and Formula 4 represent relational expressions in conversion from the rotating coordinate system to a two-phase fixed coordinate system and conversion from the two-phase fixed coordinate system to a three-phase fixed coordinate system, respectively. According to Formula 3 and Formula 4, the dq-axis voltages Vd and Vq are converted into three-phase voltages Vu, Vv, and Vw of the three-phase fixed coordinate system with αβ-axis voltages Vα and Vβ of the two-phase fixed coordinate system as a mediator. Here, λ in Formula 4 is a coefficient that differs depending on a type of a conversion formula to be used, $\lambda=\sqrt{(2/3)}$ in the absolute conversion, and $\lambda=1$ in the relative conversion.

$$\begin{bmatrix} V_\alpha \\ V_\beta \end{bmatrix} = \begin{bmatrix} \cos\theta & -\sin\theta \\ \sin\theta & \cos\theta \end{bmatrix} \begin{bmatrix} V_d \\ V_q \end{bmatrix} \qquad \text{[Formula 3]}$$

$$\begin{bmatrix} V_u \\ V_v \\ V_w \end{bmatrix} = \lambda \begin{bmatrix} 1 & 0 \\ -\frac{1}{2} & +\frac{\sqrt{3}}{2} \\ -\frac{1}{2} & -\frac{\sqrt{3}}{2} \end{bmatrix} \begin{bmatrix} V_\alpha \\ V_\beta \end{bmatrix}$$

[Formula 4]

An AC signal is obtained by conversion based on the phase θ by Formula 3, and command values of two-phase or three-phase applied voltages are calculated in the fixed coordinate systems. In order to apply a voltage to the motor 1 based on the command value of the applied voltage, pulse width modulation (PWM) is performed to replace the magnitude of amplitude of the applied voltage command value with the length of the width of a binary signal pulse of High and Low. As a result of the pulse width modulation, a duty ratio, which is a time ratio of a signal state, is updated for each carrier frequency of the pulse width modulation.

Figure 3:
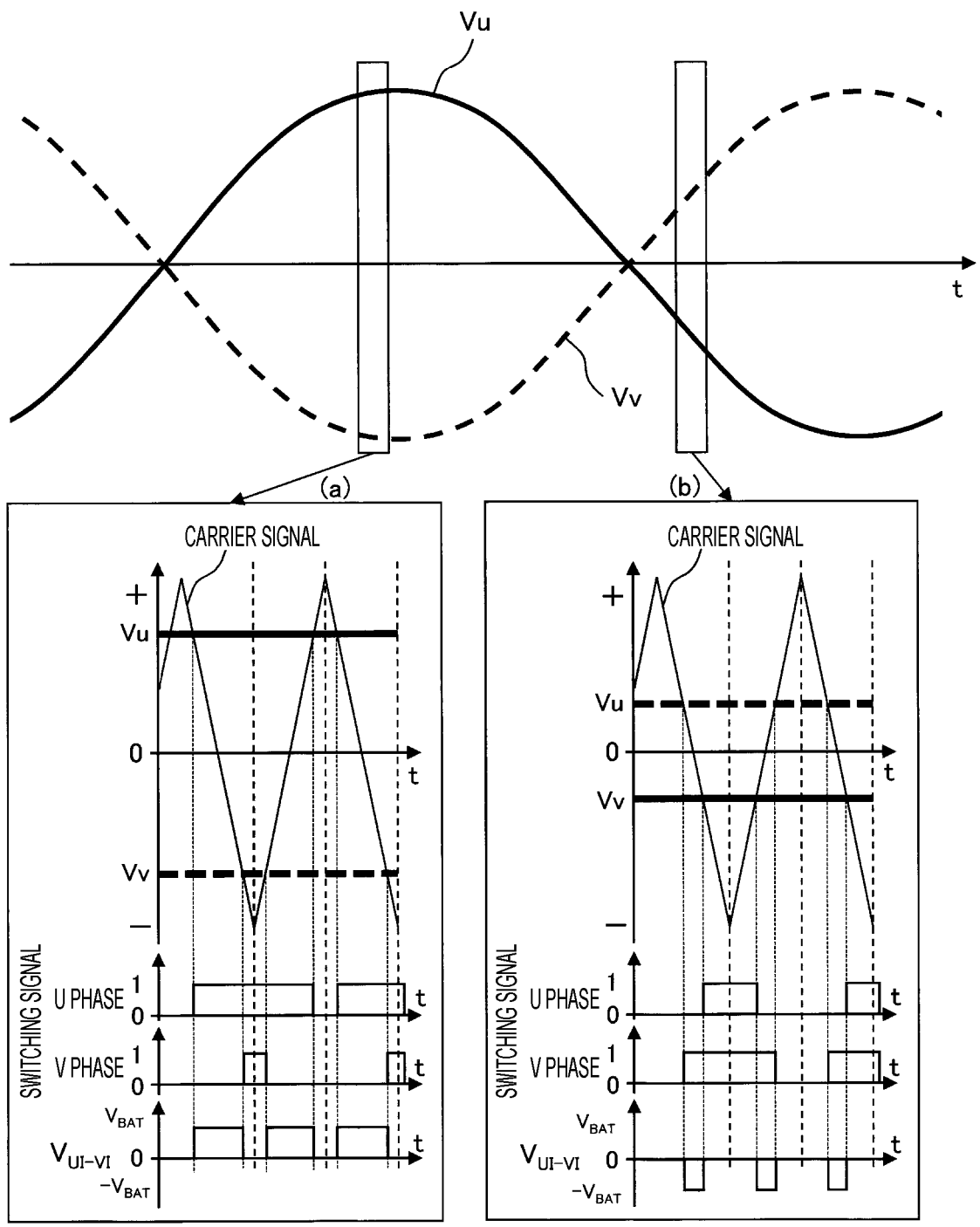
FIG. 3 is a view illustrating a method of calculating a switching signal in an H-bridge circuit of FIG. 2.

FIG. 3 illustrates a method of calculating the binary signal pulse in the H-bridge circuit. Two states, on-state and off-state, are controlled by the binary signal pulses based on the positive voltage command value Vu of the U phase for Q1 and Q2 illustrated in FIG. 2 and the negative voltage command value Vv for Q3 and Q4. In FIG. 3, (a) and (b) are views illustrating comparison results with a PWM carrier signal by enlarging a time axis with respect to different phases of voltage command values.

Pulse width modulation is performed using a carrier signal having a frequency sufficiently higher than a fundamental frequency of a voltage command value. At this time, it is possible to consider that the voltage command value is substantially constant, and is approximated by a straight line in FIGS. 3(a) and 3(b). A switching signal is calculated by comparing the voltage command values Vu and Vv with the magnitude of the carrier signal. In the switching signal, High and Low are indicated by 1 and 0.

For example, in the case of the U phase, if the switching signal is 1, the upper arm Q1 is turned on and the lower arm Q2 is turned off. Conversely, if the switching signal is 0, the upper arm Q1 is turned off and the lower arm Q2 is turned on. As a result, a voltage difference between the U-phase output UI and the V-phase output VI becomes a lowermost waveform in FIGS. 3(a) and 3(b), and a waveform, obtained by modulating the voltage command value Vu in a pulse shape, is applied as an AC voltage to the winding 2 of the motor 1.

Figure 4:
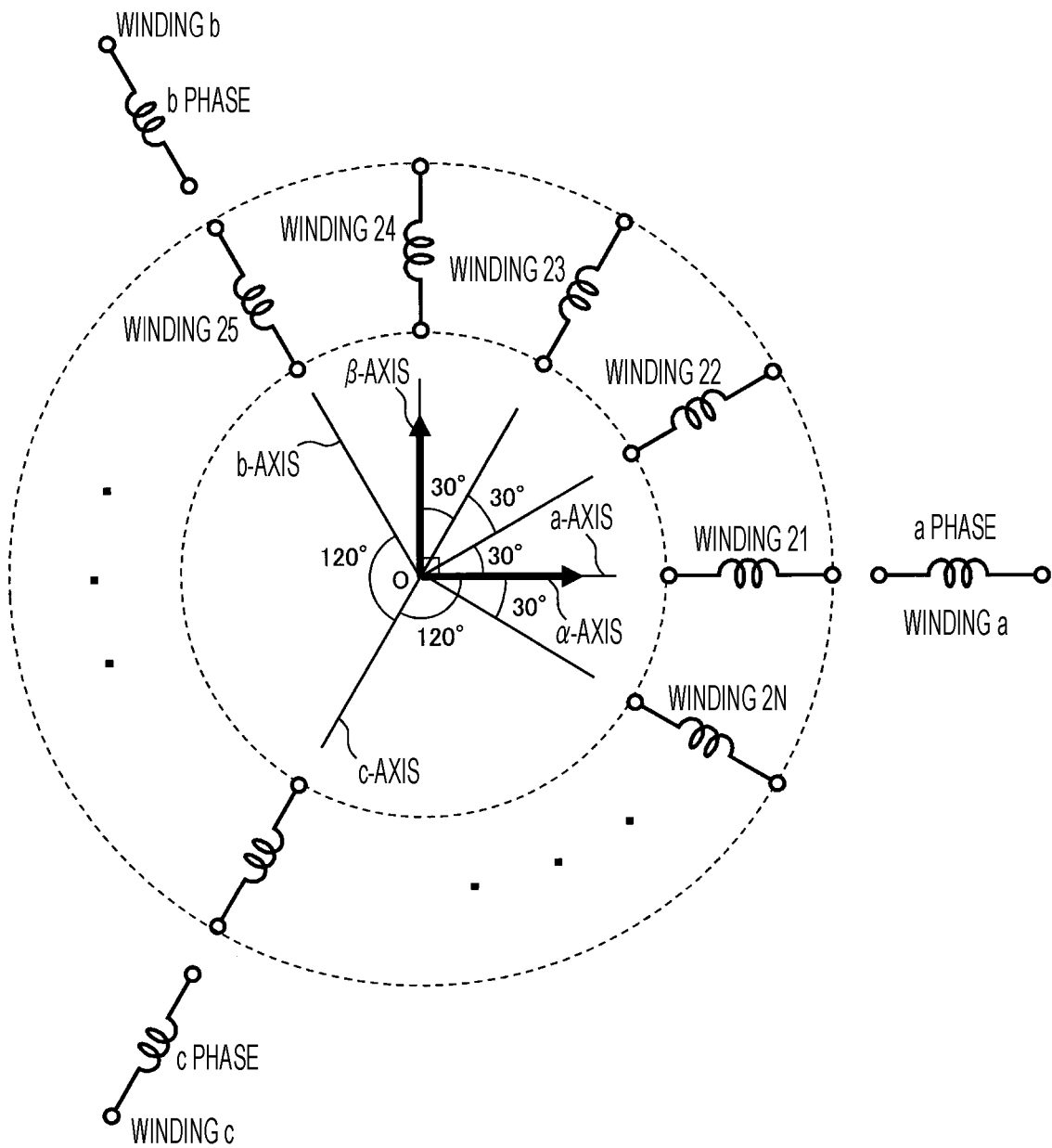
FIG. 4 is a view illustrating a relationship between phases of a voltage command value and an arrangement of windings.

FIG. 4 illustrates a relationship between an arrangement of the single-phase windings 2 and phases. The phase is represented by an electrical angle, and the winding 2 is arranged from 1 to N such that one turn is 360°. A motor structure is assumed in which the respective single-phase windings of the winding 2 are arranged as a winding 21, a winding 22, . . . , and a winding 2N shifted each by an electrical angle of 30°. At this time, N=12.

The winding 21 is set as a reference angle, and is considered to coincide with an a-axis among the a-axis, a b-axis, and a c-axis arranged equally by 120° in a three-phase AC. The a-axis coincides with the α-axis of a two-phase stator coordinate axis, and the β-axis is at a position advanced by 90°.

Here, assumed are an a-phase winding which is a winding a on the a-axis, a b-phase winding which is a winding b on the b-axis, and a c-phase winding which is a winding c on the c-axis. An AC magnetic field is generated by applying a three-phase AC voltage having phases shifted by 120° as the a-phase, the b-phase, and the c-phase. As a result, the windings 21 to 2N can generate an AC magnetic field similar to the three-phase AC as a result by applying a voltage waveform whose phase has been changed by 30° which is a phase shift from the windings a, b, and c. Therefore, it is possible to apply an AC voltage of an appropriate phase by setting the voltage command value Vu illustrated in FIG. 3 to a phase based on the arrangement of each winding.

Next, a transmission path signal calculated by the main calculation device 5 will be described. The main calculation device 5 calculates switching signals as many as the number of switching elements of an inverter. For example, in the case of an H-bridge, four signals are calculated. Since the inverter 3 includes N H-bridge circuits, 4N signals are required.

Here, it is necessary to transmit 2N signals, which is half, to the inverter 3 if the signals are regarded as the same signal by using the fact that the signals of the upper and lower arms are inverted signals of High and Low having a dead time period for preventing short circuits of the upper and lower arms.

These 4N to 2N switching signals are transmitted to the sub-calculation device 7 via the common transmission paths 6A and 6B instead of independent transmission paths. The sub-calculation device 7 drives the inverter 3 using the received switching signal, and applies an AC voltage based on a voltage command value to the motor 1.

Figure 5:
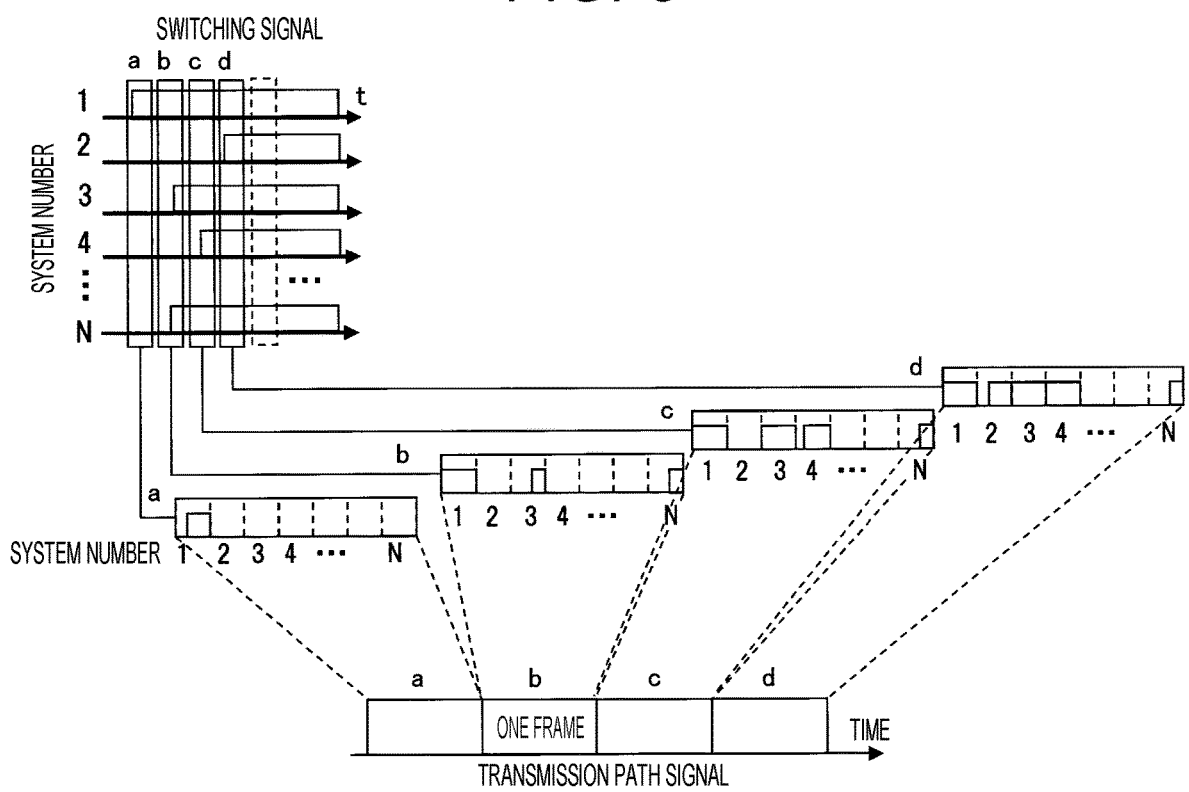
FIG. 5 is a view illustrating a method of modulating a transmission path signal.

Next, a modulation method of a transmission path signal output from the main calculation device 5 to the transmission paths 6A and 6B and a demodulation method in which the sub-calculation device 7 receives the transmission path signal and restores the original signal will be described. FIG. 5 illustrates a method in which the N inverters of the inverter 3 are denoted by system numbers 1 to N, and a switching signal of each system number is divided into frames named a, b, c, and d for each fixed time division width.

In one frame, states of switching signals with system numbers 1 to N are held in a predetermined storage order. The main calculation device 5 repeatedly updates the states of signals with the system numbers 1 to N of one frame for each frame, so that a transmission path signal becomes a signal obtained by modulating the switching signals of N systems.

In order to restore a switching signal of each system, which is the original signal, from the transmission path signal, action opposite to that in FIG. 3 is applied. Since the system numbers 1 to N are set in the predetermined storage order, each system of the sub-calculation device 7 samples (selects) and holds a signal in a predetermined order of each frame. This may be performed once per frame for one signal. This held signal is a switching signal calculated for each system by the main calculation device 5, which is the original signal. The transmission path signal is a binary signal of High and Low, and thus, is resistant to noise.

The main calculation device 5A and the main calculation device 5B output transmission path signals to the transmission path 6A and the transmission path 6B, respectively. The sub-calculation device 7 receives the transmission path signals of both the transmission path 6A and the transmission path 6B, and selects any one signal thereof according to a predetermined condition to drive the inverter 3. The predetermined condition includes a case where any one of the main calculation devices 5A and 5B fails. Even when any one of the main calculation devices 5 fails, the switching signal can be transmitted to all the sub-calculation devices 7 by the remaining one, and thus, the operation can be continued without impairing the output of the motor.

FIG. 5 illustrates switching signals with the system numbers 1 to N of the same phase. Regarding a transmission path signal, the same phase may be used as the same transmission path signal, or a combination of different systems and different phases may be used as the same transmission path signal.

Further, the motor 1 is illustrated as a single-phase winding, but the motor 1 may be a three-phase winding. In the case of the three-phase winding, the inverter can use a three-phase full-bridge circuit including six elements, instead of the H-bridge circuit including four elements. Since three phases can be controlled by the six elements rather than controlling one phase by the four elements, the circuit utilization efficiency is good.

Figure 6:
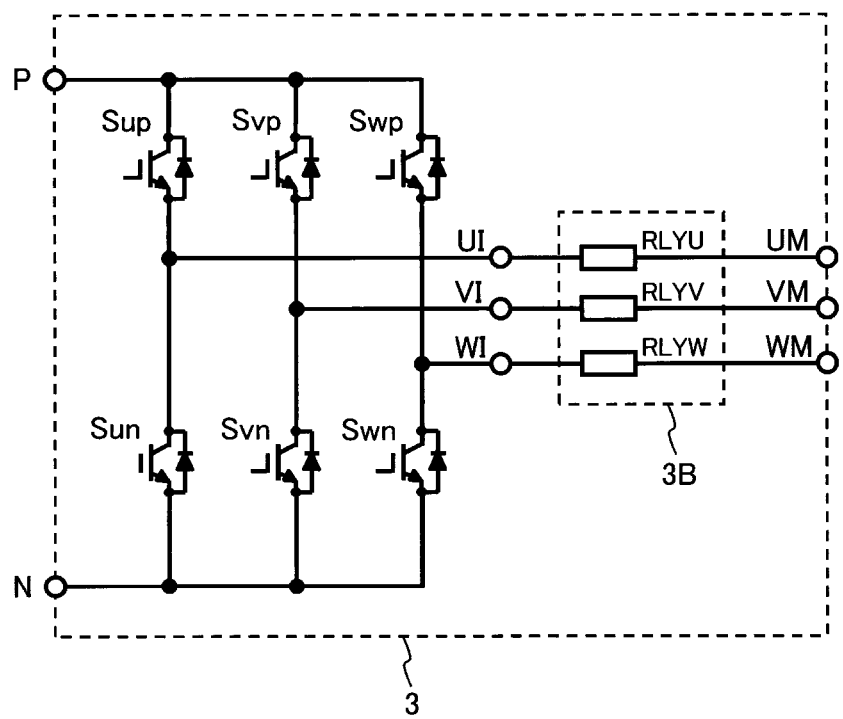
FIG. 6 is a diagram illustrating a modification of the inverter 3.

FIG. 6 illustrates an example of a configuration of a three-phase full-bridge circuit which is a modification of FIG. 2. The three-phase full-bridge circuit is configured using six elements including an upper arm Sup and a lower arm Sun connected to the U-phase output UI, an upper arm Svp and a lower arm Svn connected to the V-phase output VI, and an upper arm Swp and a lower arm Swn connected to a W-phase output WI. Further, a phase relay 3B may be provided for the purpose of cutting off a connection with the winding 2 when the inverter 3 fails, which is similar to the H-bridge circuit (FIG. 2). The phase relay 3B is inserted between each of the phase outputs UI, VI, and WI and each of the phase inputs UM, VM, and WM of the winding 2. An operation (action) and an effect are similar to those in the case of the H-bridge circuit illustrated in FIG. 2.

Figure 7:
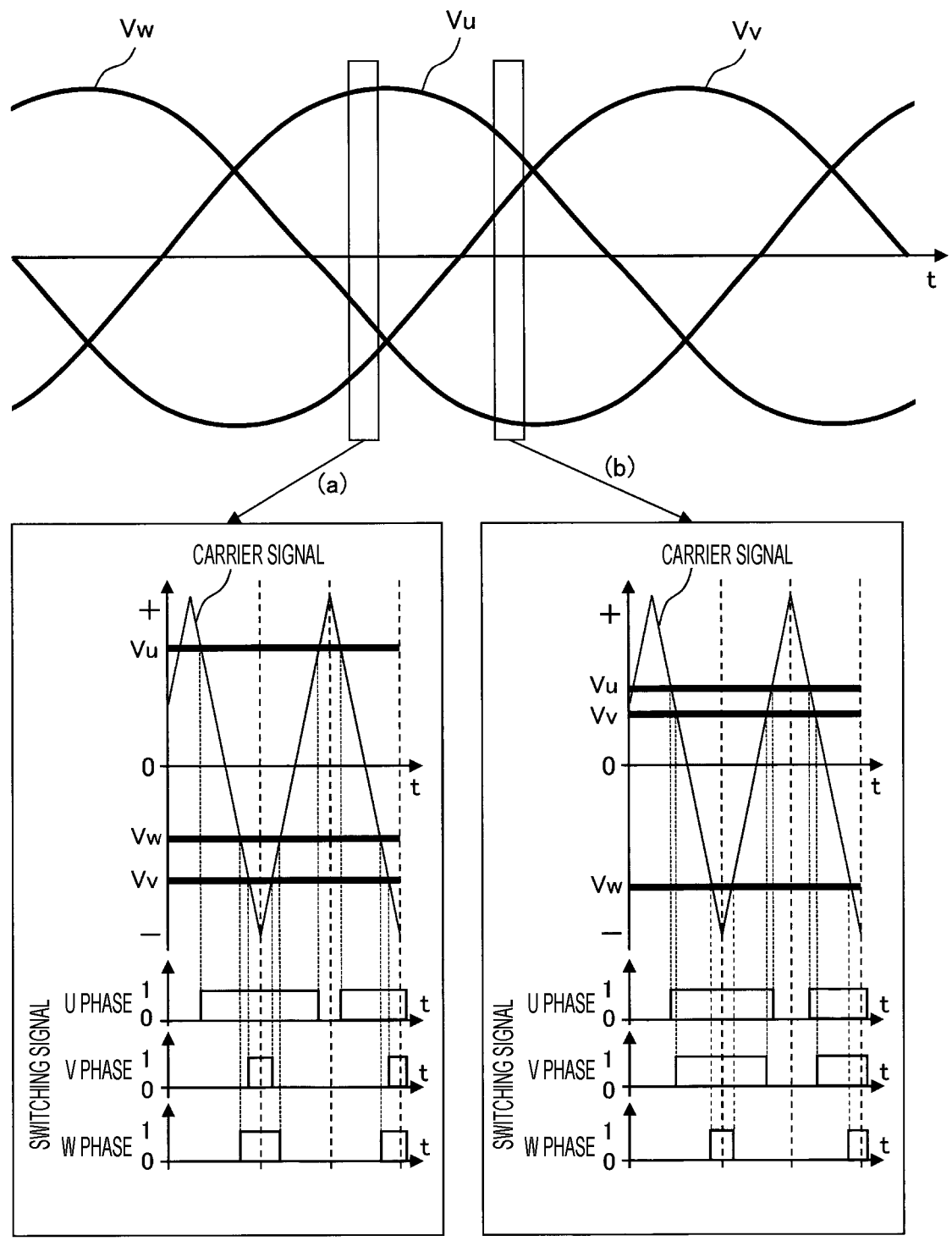
FIG. 7 is a view illustrating a method of calculating a switching signal in a three-phase full-bridge circuit of FIG. 6.

FIG. 7 illustrates a method of calculating a binary signal pulse in the three-phase full bridge circuit. Two states, on-state and off-state, are controlled by binary signal pulses based on the U-phase voltage command value Vu for Sup and Sun illustrated in FIG. 6, the V-phase voltage command value Vv for Svp and Svn, and the W-phase voltage command value Vw for Swp and Swn.

In FIG. 7, (a) and (b) are views illustrating comparison results with a PWM carrier signal by enlarging a time axis with respect to different phases of voltage command values, which is similar to FIG. 3. A switching signal is calculated by comparing the voltage command values Vu, Vv, and Vw with the magnitude of the carrier signal. If the upper and lower arms of each phase are controlled to be turned on and off based on the switching signal, the voltage command value of each phase is modulated in a pulse shape and applied as an AC voltage to the winding 2 of the motor 1.

As described above, the power conversion device of the present embodiment includes: the plurality of inverter circuits 3 connected in parallel to the load (motor 1), the microcomputer (main calculation device 5) that controls the plurality of inverter circuits 3; a plurality of signal selection units (sub-calculation devices 7) that select a drive signal of each of the plurality of inverter circuits 3; and the first transmission path 6A and the second transmission path 6B which are connected in parallel between the microcomputer (main calculation device 5) and the plurality of signal selection units (sub-calculation devices 7) and transmit the drive signal of each of the plurality of inverter circuits 3 from the microcomputer (main calculation device 5) to each of the plurality of signal selection units (sub-calculation device 7). Each of the plurality of signal selection units (sub-calculation devices 7) selects any one of a first drive signal transmitted from the first transmission path 6A and a second drive signal transmitted from the second transmission path 6B.

Then, the first drive signal and the second drive signal are switching signals divided by a predetermined time for each system of the plurality of inverter circuits 3.

Further, the number of microcomputers (the main calculation devices 5) is smaller than the number of the inverter circuits 3. The number of the inverter circuits 3 is the same as the number of signal selection units (the sub-calculation devices 7).

As a result, it is possible to realize the power conversion device including the plurality of inverter circuits connected in parallel to the load, the power conversion device having high reliability and being advantageous for miniaturization and cost reduction.

Second Embodiment

Figure 8:
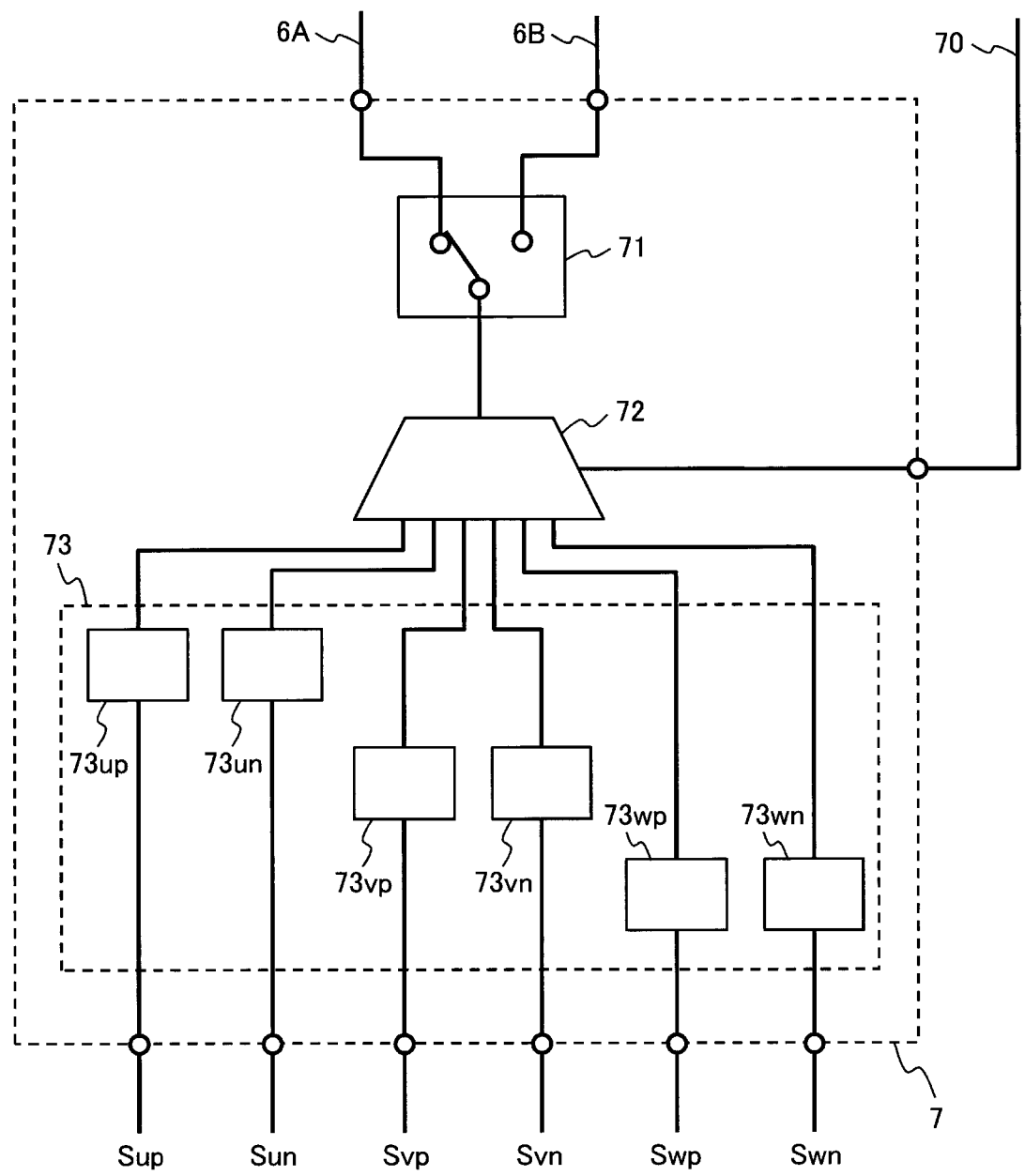
FIG. 8 is a diagram illustrating a configuration example of a sub-calculation device 7 in FIG. 1.

A power conversion device according to a second embodiment of the present invention will be described with reference to FIG. 8. FIG. 8 illustrates an example in which the sub-calculation device 7 is configured using simple signal selection unit 72 and signal holding unit 73. A necessary input between input signals of the transmission path 6A and the transmission path 6B is selected by a transmission path switching unit 71. Since the transmission path 6A and the transmission path 6B are connected to the main calculation device 5A and the main calculation device 5B, respectively, a normal one is selected when a failure occurs in any of the main calculation devices 5.

An output of the transmission path switching unit 71 is input to the signal selection unit 72. The signal selection unit 72 samples (selects) a transmission path signal according to the main calculation device 5 or a timing signal 70 from which a predefined timing can be acquired. The sampled signal is input to the signal holding unit 73. At this time, the signal selection unit 72 appropriately distributes the switching signals Sup, Sun, Svp, Svn, Swp, and Swn of the upper and lower arms of the inverters 3 by switching output destinations of the sampled signals. The signal holding unit 73 includes signal holding units (73up, 73un, 73vp, 73vn, 73wp, and 73wn) respectively for the switching signals.

With this configuration, the transmission path signal is a binary signal, and thus, the sub-calculation device 7 can be configured by a small-scale circuit and a storage device without requiring an advanced calculation device that performs the four arithmetic operations. As a result, the sub-calculation device 7 can be realized with a simple and small circuit.

Third Embodiment

Figure 9:
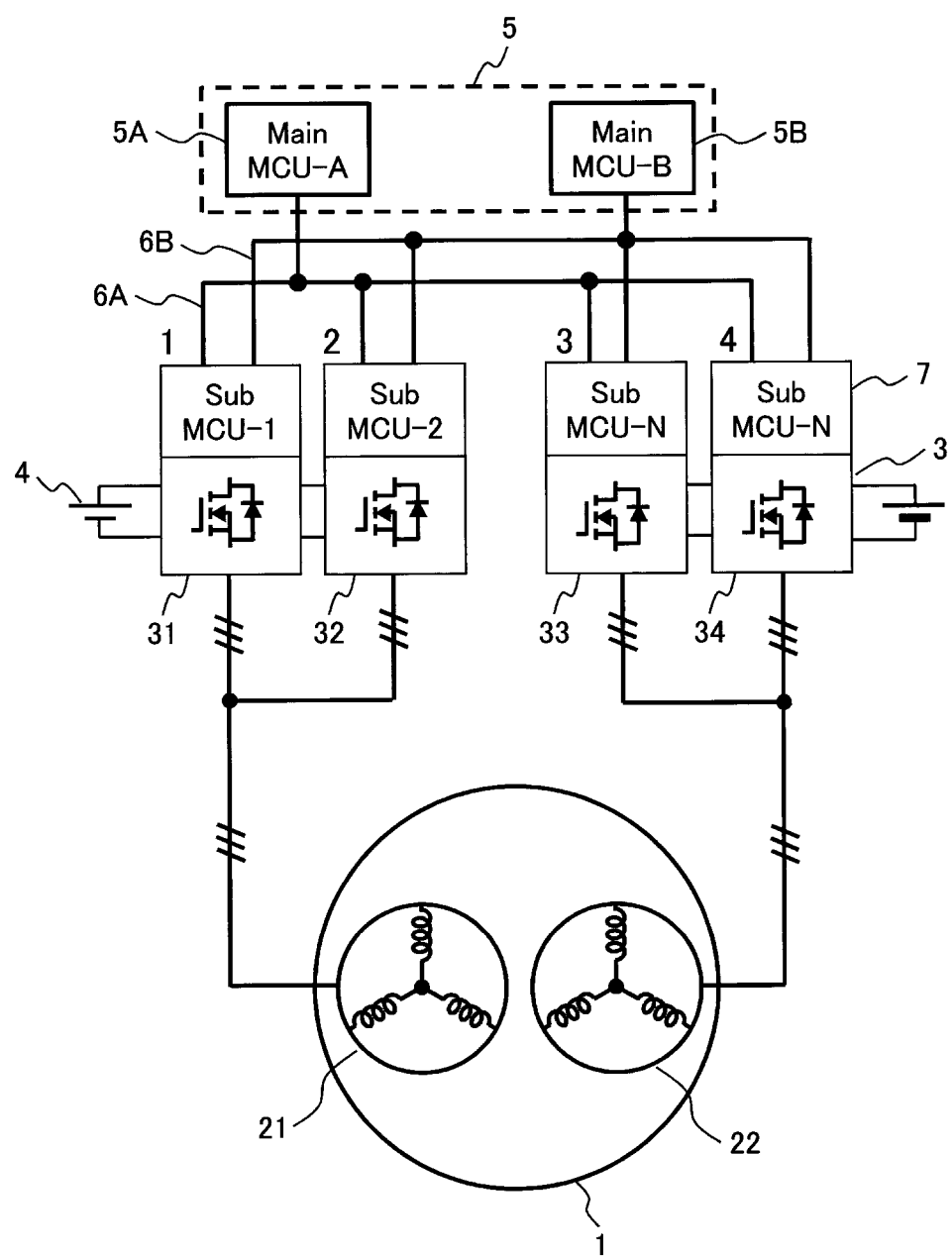
FIG. 9 is a diagram illustrating a connection example (modification) with respect to a load (motor).

A power conversion device according to a third embodiment of the present invention will be described with reference to FIG. 9. FIG. 9 is an example in which a motor as a load is configured by the double-winding motor 1 and two inverters 3 are arranged in parallel for each winding, that is, the four inverters 3 are arranged in parallel, and corresponds to a modification of the first embodiment (FIG. 1). The double-winding motor 1 has a three-phase winding configuration in which a first winding 21 and a second winding 22 are wound independently from a motor stator having the same rotation axis.

An inverter 31 and an inverter 32, which are system numbers 1 and 2 of the inverter 3, are connected in parallel to the first winding 21. Similarly, an inverter 33 and an inverter 34, which are system numbers 3 and 4 of the inverter 3, are connected in parallel to the second winding 22.

Since the first winding 21 and the second winding 22 operate symmetrically, the first winding 21 will be described below as an example. The inverter 31 and the inverter 32 connected in parallel to the first winding 21 output an AC voltage based on a voltage command value in which phases of a three-phase output substantially coincide.

As a result, output currents of the inverter 31 and the inverter 32 are summed and flow through the first winding 21. When the inverter 31 or the inverter 32 fails, the failed inverter is disconnected from a circuit by the phase relay 3B provided in the inverter 3, and the operation is continued by the remaining inverter.

At this time, the sub-calculation device 7 connected to the failed inverter 3 stops selecting a transmission path signal. Further, regarding the failure of the inverter, current information (or temperature information calculated based on the current information), obtained from a current sensor attached to each phase or a DC current sensor such as a shunt resistor provided between terminals P or terminals N between PN connected to the DC voltage power supply 4, is monitored, and it is determined that a failure occurs when an excessive current exceeding a predetermined threshold flows.

Figure 10:
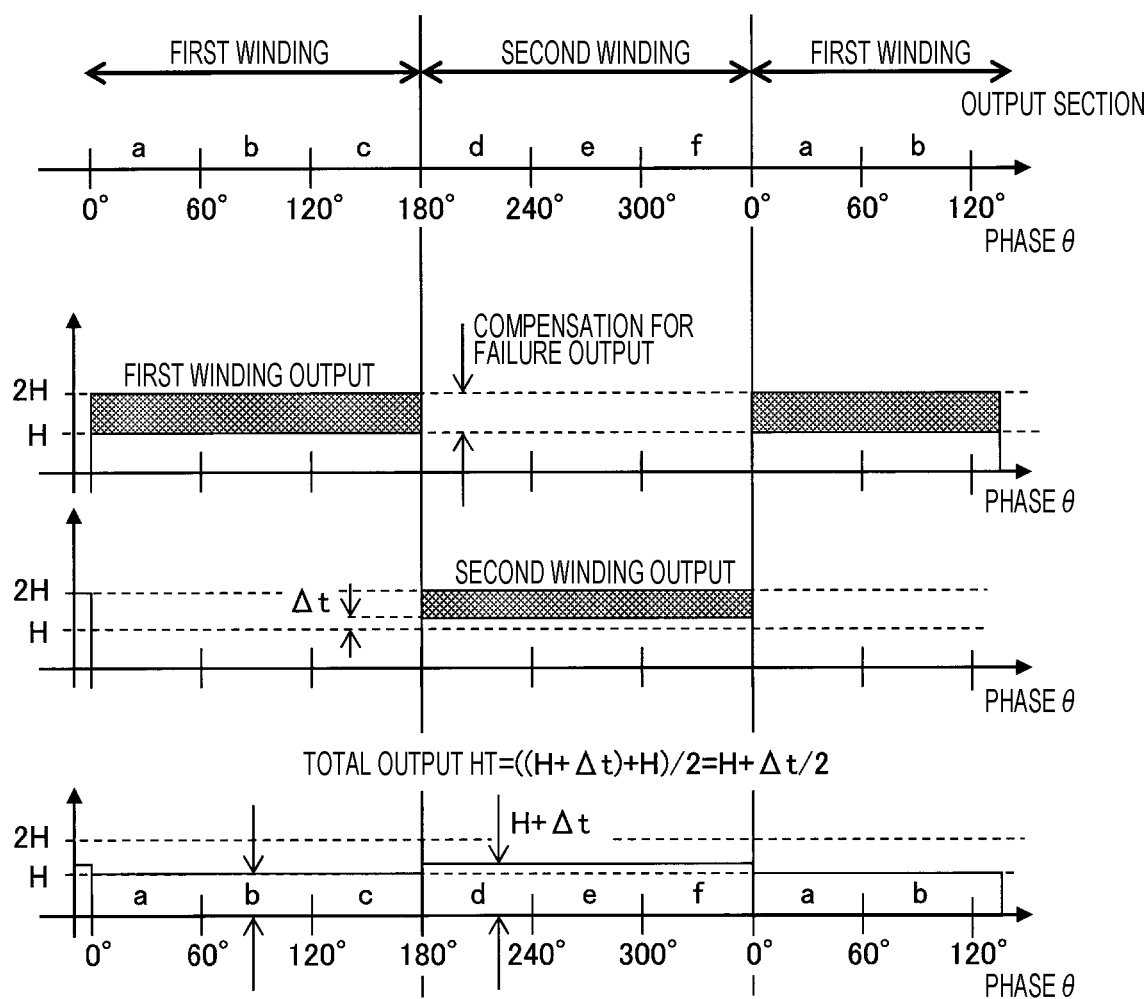
FIG. 10 is a view illustrating an operation example when an inverter failure occurs.

FIG. 10 illustrates an operation after a circuit of the failed inverter has been disconnected due to a failure in either the inverter 31 or the inverter 32 of the first winding 21. Assuming that one inverter output is H, a first winding output becomes an output 2H in a normal state, but becomes an output H when the failure occurs. The second winding 22 can output up to the output 2H in the normal state. When a total output HT is equal to or less than the output H, the output can be covered by the remaining inverter of the first winding, and thus, both the first winding and the second winding output the same output.

When the total output HT exceeds the output H, the first winding outputs the output H, the second winding outputs more than the first winding by Δt as an adjustment, and the output of the second winding becomes (H+Δt). As a result, the total output HT becomes Formula 5. Since Δt can be output up to H at maximum, up to ¾ of 2H in the normal state is output.

$$H_T = \frac{H + (H + \Delta t)}{2} = H + \frac{\Delta t}{2} \quad \text{[Formula 5]}$$

By performing such an operation, the outputs of the first winding 21 and the second winding 22 are equal under a condition where a low output is required, and it is possible to continue the operation comparable to the normal state of the inverter. Further, the operation can be performed with an output up to 75% of that in the normal state under a condition where a high output is required.

Further, in a case where the inverter 3 is designed with a rated output HR larger than the output H, a difference between the rated output HM and the output H is given by Formula 6 as Δh.

$$\Delta h = H_R - H \quad \text{[Formula 6]}$$

When one inverter fails among the four parallel inverters, the total output HT of Formula 7 is obtained in a case where the differential output Δh is added by the remaining three inverters. As compared with the output 2H in the normal state, an output of Formula 8 is obtained.

$$H_T = \frac{(H + \Delta h) + 2(H + \Delta h)}{2} = \frac{3}{2}(H + \Delta h) \quad \text{[Formula 7]}$$

$$\frac{H_r}{2H} = \frac{\frac{3}{2}(H + \Delta h)}{2H} = \frac{3}{4}\left(1 + \frac{\Delta h}{H}\right) \quad \text{[Formula 8]}$$

When the rated output HM has a margin, Δh/H can be added to the output which is 75% of the output in the normal state.

That is, the power conversion device of the present embodiment includes a plurality of microcomputers (main calculation devices 5A and 5B). The plurality of microcomputers (main calculation device 5A, 5B) output a first drive signal and a second drive signal divided at different timings. The plurality of signal selection units (sub-calculation devices 7) change a drive signal selected in the plurality of microcomputers (main calculation device 5A, 5B) to a drive signal for driving with a gradually decreased output or a driving stop and a drive signal for compensating for an insufficient output in cooperation with the drive signal, based on temperatures or current values of the plurality of inverter circuits 3.

Fourth Embodiment

Figure 11:
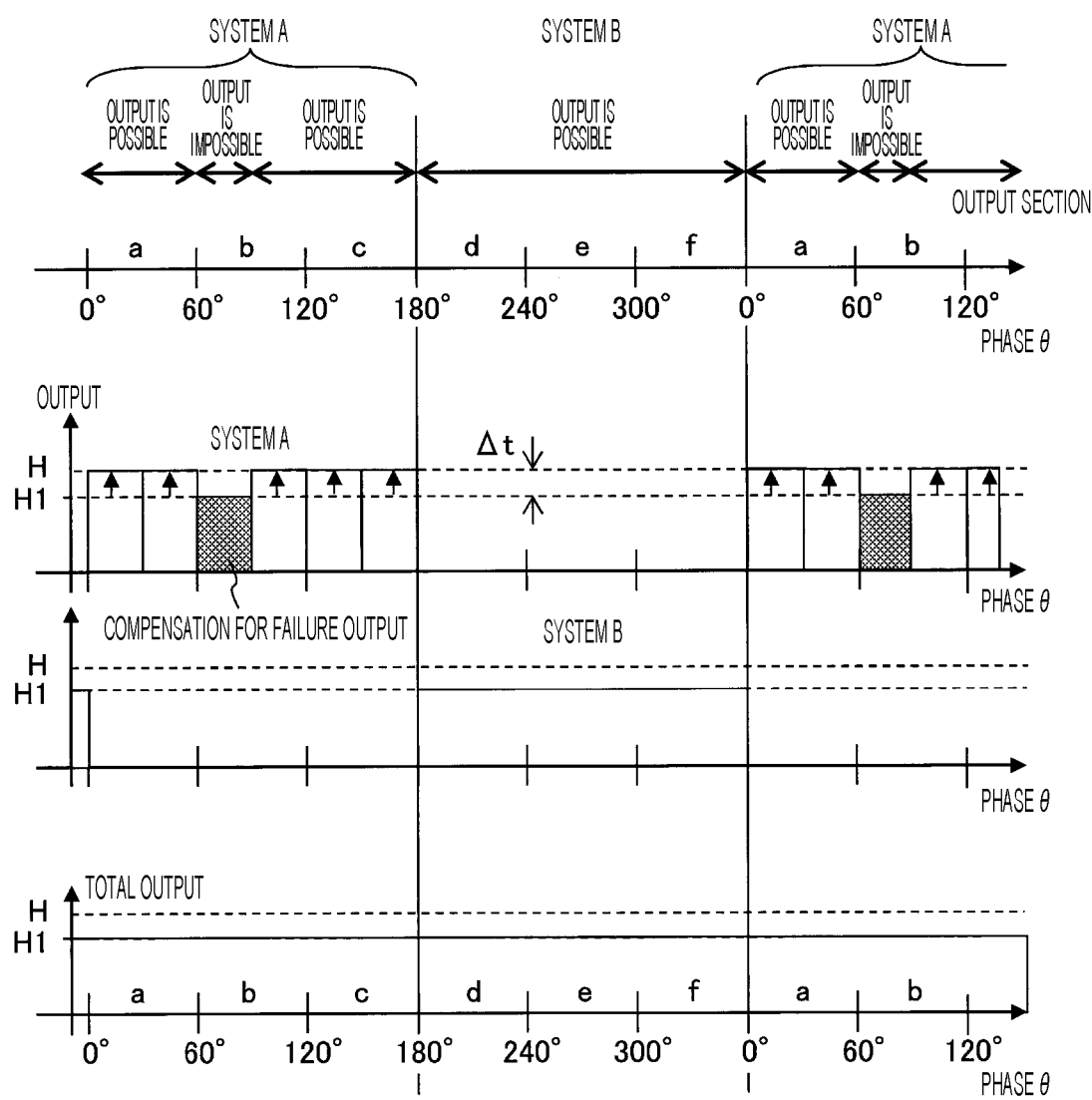
FIG. 11 is a view illustrating an operation example when an inverter failure occurs.

A power conversion device according to a fourth embodiment of the present invention will be described with reference to FIG. 11. FIG. 11 illustrates an operation example when an inverter failure occurs in a configuration in which the winding 2 of the motor 1 is a single-phase winding. First, the configuration is illustrated in which the inverters 3 are operated based on any command value of the main calculation devices 5A and 5B, or are divided into a portion at an electrical angle of 0° to 180° and a portion at an electrical angle of 180° to 360°, and the portion from 0° to 180° is set as a system A operating according to the main calculation device 5A, and the portion from 180° to 360° is set as a system B operating according to the main calculation device 5B. FIG. 11 illustrates a case where one inverter corresponding to a winding at an electrical angle of 60° to 90° fails.

An output of the remaining inverter of the system A that is the same system as the failure inverter is increased by Δt to compensate for a failure output. In this manner, the system B can maintain a total output without changing the output. Δt is given by Formula 9. It suffices that H1+Δt is equal to or less than the maximum output H of one inverter.

$$\Delta t = \frac{1}{3}H_1 \quad \text{[Formula 9]}$$

Figure 12:
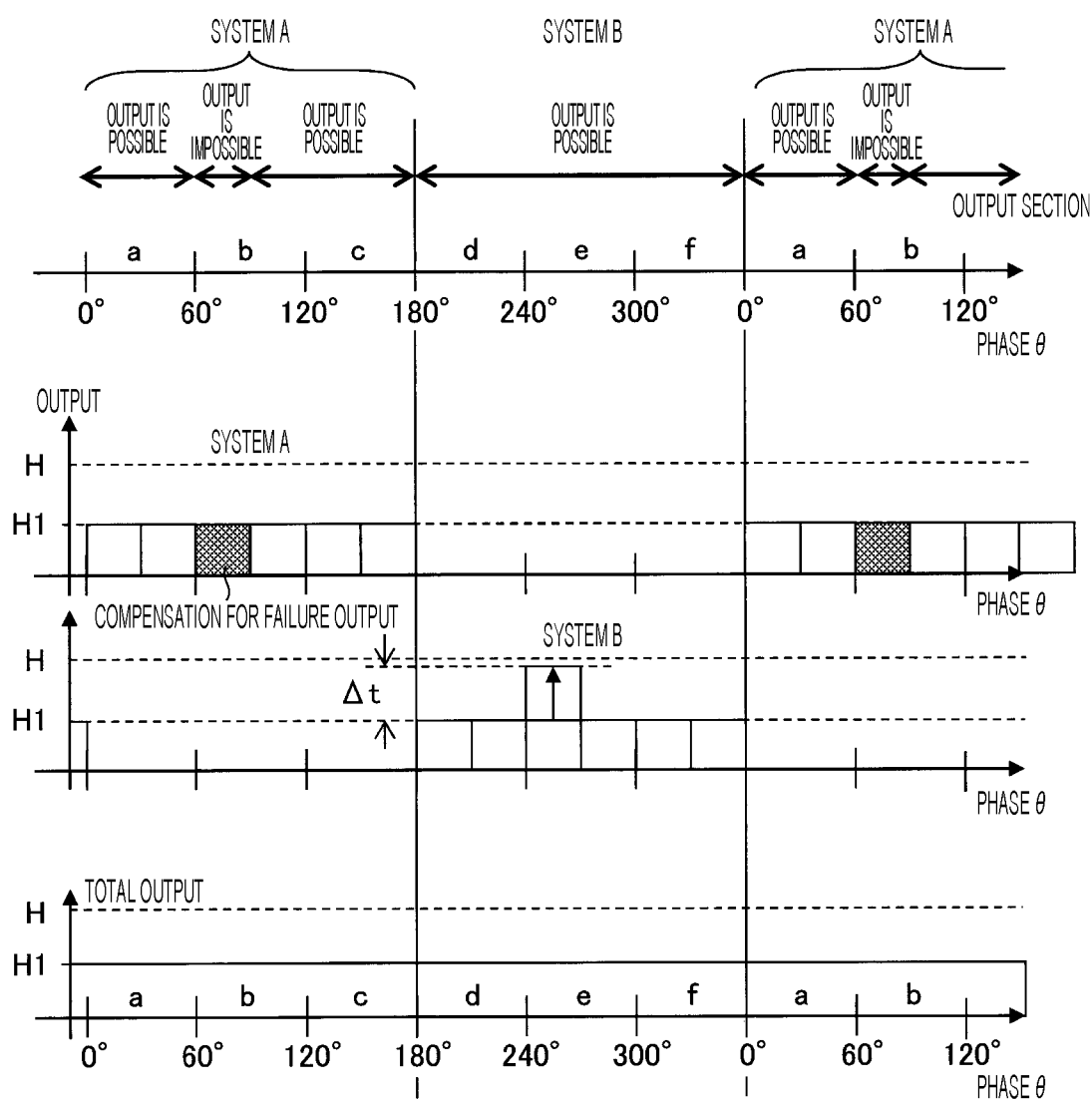
FIG. 12 is a view illustrating an operation example when an inverter failure occurs.

FIG. 12 illustrates another output compensation method when an inverter failure similar to that in FIG. 11 occurs. In a case where the inverter corresponding to the winding at the electrical angle of 60° to 90° fails, one inverter output of the system B different from the system A of the failure inverter is increased. The inverter whose output is to be increased is an inverter corresponding to a winding from 240° to 270° which is arranged to face the electrical angle of 60° to 90°. With such a configuration, it is possible to compensate for the output at a symmetrical arrangement with respect to a structure of the motor 1, and it is possible to reduce the influence of the inverter failure.

Fifth Embodiment

Figure 13:
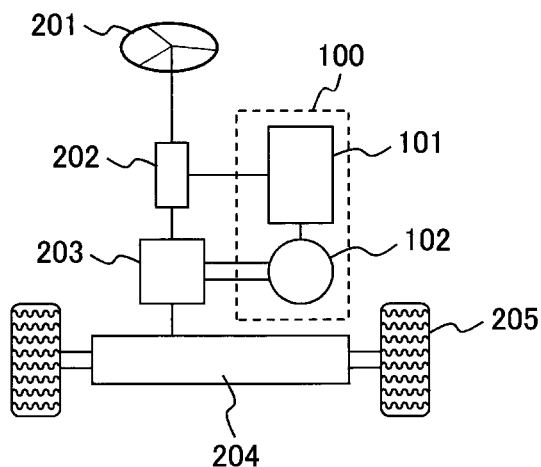
FIG. 13 is a diagram illustrating a configuration example of an electric power steering device according to an embodiment of the present invention.

An electric power steering device according to a fifth embodiment of the present invention will be described with reference to FIG. 13. FIG. 13 illustrates an electric power steering device that steers a traveling direction of a vehicle. A steering wheel 201 is controlled to operate a steering mechanism 204 via a torque sensor 202 and a steering assist mechanism 203, and a direction of a tire (wheel) 205 is changed to steer the traveling direction of the vehicle.

The steering assist mechanism 203 outputs a steering force for operating the steering mechanism 204 with a resultant force of a manual steering force of the steering wheel 201 and a steering force by electric assist obtained from a motor drive system 100. In the motor drive system 100, a power conversion device 101 obtains a shortage of the manual steering force from an output obtained from the torque sensor 202 and drives a motor 102 as the electric assist steering force.

As the power conversion device 101, the power conversion device described in each of the above embodiments is used. In the motor drive system 100, the steering force becomes substantially zero under a traveling condition where the vehicle is steered straight. Under this condition, all the sub-calculation devices 7 select only one of outputs of the main calculation device 5A or 5B.

As a result, it is possible to remove the influence of a minute change, such as a calculation error and a synchronization deviation between the main calculation devices 5A and 5B, and it is possible to appropriately respond to driving under an extremely minute load condition where the steering force is substantially zero. As a result, stable traveling can be realized.

Sixth Embodiment

Figure 14:
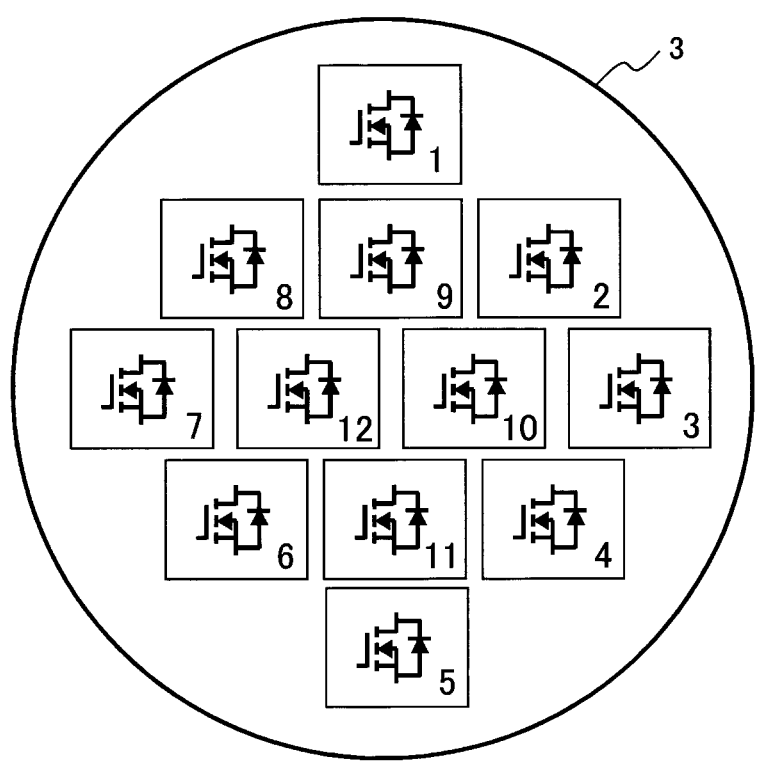
FIG. 14 is a view illustrating an arrangement layout of inverter circuits according to an embodiment of the present invention.

A power conversion device according to a sixth embodiment of the present invention will be described with reference to FIG. 14. FIG. 14 is a view schematically illustrating an example of an arrangement layout of inverter circuits in the inverter 3. The respective inverter circuits are indicated by system numbers 1 to 12, and the inverter circuits with the system numbers 1 to 8 on the outer periphery and the inverter circuits with the system numbers 9 to 12 on the inner periphery are arranged. In the arrangement on the outer periphery and the inner periphery, a difference occurs in heat dissipation characteristics, and heat dissipation characteristics of the inverter circuits with the system numbers 9 to 12 on the inner periphery deteriorate.

Therefore, the inverter circuit 9 to 12 arranged on the inner periphery gradually decrease outputs, and outputs of the inverter circuit 1 to 8 arranged on the outer periphery are increased by the gradually decreased amount according to the configurations (methods) described in the above first to fourth embodiments. Further, when a required total output is small, the inverters 9 to 12 on the inner periphery are stopped and the operation is performed only with the inverters 1 to 8 on the outer periphery. In this manner, it is possible to satisfy the heat dissipation characteristics without changing the total output, and to improve the reliability of the power conversion device.

Seventh Embodiment

A power conversion device according to a seventh embodiment of the present invention will be described with reference to FIGS. 1 and 5 of the first embodiment. In the present embodiment, transmission start and transmission end signals are added to transmission path signals of the transmission paths 6A and 6B. Further, an error detection code is added to each frame. With such a configuration, it is possible to increase the resistance against noise and to suppress erroneous detection. Further, a signal inverted by noise can be corrected according to the error detection code, and thus, characteristics under a noise environment can be improved.

Incidentally, the motor of the electric power steering device of an automobile is assumed as the load to which the power conversion device (the plurality of inverter circuits) is connected in each of the above embodiments. However, the present invention is not limited thereto, and it goes without saying that the present invention can be applied to a motor of an electric brake of an automobile or a motor of another electric actuator.

Further, the present invention is not limited to the above-described embodiments and includes various modifications. For example, the above-described embodiments have been described in detail in order to facilitate understanding of the present invention, and are not necessarily limited to one including the entire configuration that has been described above. Further, a part of the configuration of a certain embodiment can be replaced with the configuration of another embodiment, and the configuration of another embodiment can be added to the configuration of a certain embodiment. Further, addition, deletion or substitution of other configurations can be made with respect to some configurations of each embodiment.

REFERENCE SIGNS LIST

1, 102 motor
2 winding
3, 31, 32, 33, 34 inverter (circuit)
3A, 3B phase relay
4 DC voltage power supply
5 main calculation device (microcomputer)
5A main calculation device (main MCU-A)
5B main calculation device (main MCU-B)
6A, 6B transmission path
7 sub-calculation device
21 first winding
22 second winding
70 timing signal
71 transmission path switching unit
72 signal selection unit
73 signal holding unit
100 motor drive system
101 power conversion device
201 steering wheel
202 torque sensor
203 steering assist mechanism
204 steering mechanism
205 tire (wheel)

The invention claimed is:

1. A power conversion device comprising:
   a plurality of inverter circuits connected in parallel to a load;
   a microcomputer which controls the plurality of inverter circuits;
   a plurality of signal selection units which select a drive signal of each of the plurality of inverter circuits; and
   a first transmission path and a second transmission path which are connected in parallel between the microcomputer and the plurality of signal selection units and transmit the drive signal of each of the plurality of inverter circuits from the microcomputer to each of the plurality of signal selection units, wherein each of the plurality of signal selection units selects any one of a first drive signal transmitted from the first transmission path and a second drive signal transmitted from the second transmission path.

2. The power conversion device according to claim 1, wherein the first drive signal and the second drive signal are switching signals divided by a predetermined time for each system of the plurality of inverter circuits.

3. The power conversion device according to claim 1, wherein
the microcomputer outputs a control signal for selecting the first drive signal or the second drive signal, and
each of the plurality of signal selection units selects the drive signal of each of the plurality of inverter circuits based on the control signal.

4. The power conversion device according to claim 1, wherein when either an inverter circuit driven by the first drive signal or an inverter circuit driven by the second drive signal fails, the microcomputer stops outputting either the first drive signal or the second drive signal corresponding to the failed inverter circuit, or the signal selection unit corresponding to the failed inverter circuit stops selecting the first drive signal and the second drive signal.

5. The power conversion device according to claim 4, wherein when the microcomputer stops output of either the first drive signal or the second drive signal corresponding to the failed inverter circuit, the microcomputer increases an output of a remaining inverter circuit other than the failed inverter circuit to perform compensation control an output of the failed inverter.

6. The power conversion device according to claim 5, wherein
the load is a motor in which a plurality of windings are arranged in a circumferential direction of an identical rotation axis, and
the compensation control increases an output of an inverter circuit connected to a winding at a position facing a winding to which the failed inverter circuit is connected.

7. The power conversion device according to claim 4, wherein
a current of each of the plurality of inverter circuits is detected, and a failure of the inverter circuit is determined based on a value of the detected current.

8. The power conversion device according to claim 4, wherein
the load is a motor in which a stator winding is divided into a first winding and a second winding,
the first winding and the second winding are connected to any one of an inverter circuit driven by the first drive signal and an inverter circuit driven by the second drive signal, and
an output of an inverter circuit connected to an identical winding system with the failed inverter circuit is increased.

9. The power conversion device according to claim 4, wherein
the load is a motor in which a stator winding is divided into a first winding and a second winding,
the first winding and the second winding are connected to anyone of an inverter circuit driven by the first drive signal and an inverter circuit driven by the second drive signal, and
an output of an inverter circuit connected to a different winding system from the failed inverter circuit is reduced to offset an output of the failed inverter circuit with a connected winding system.

10. The power conversion device according to claim 1, wherein
the power conversion device is a power conversion device that drives a motor of an electric power steering device,
the microcomputer includes a plurality of microcomputers,
the plurality of microcomputers output the first drive signal and the second drive signal divided at different timings, and
the plurality of signal selection units select any one of the first drive signal and the second drive signal based on a steering state of a steering.

11. The power conversion device according to claim 10, wherein
the plurality of signal selection units select any one of remaining microcomputers, which are not selected among the plurality of microcomputers, based on the steering state of the steering, and switches to a drive signal of the selected microcomputer to drive the motor.

12. The power conversion device according to claim 1, wherein
the microcomputer includes a plurality of microcomputers,
the plurality of microcomputers output the first drive signal and the second drive signal divided at different timings, and
the plurality of signal selection units change a drive signal selected in the plurality of microcomputers to a drive signal for driving with a gradually decreased output or a driving stop and a drive signal for compensating for an insufficient output in cooperation with the drive signal, based on temperatures or current values of the plurality of inverter circuits.

13. The power conversion device according to claim 1, wherein the first drive signal and the second drive signal include a signal related to a transmission start or a signal related to transmission completion.

14. The power conversion device according to claim 1, wherein a number of the microcomputers is smaller than a number of the inverter circuits.

15. The power conversion device according to claim 14, wherein the number of the inverter circuits is identical to a number of the signal selection units.

* * * * *